United States Patent
Ye

(10) Patent No.: US 10,708,929 B2
(45) Date of Patent: Jul. 7, 2020

(54) DEVICE AND METHOD OF HANDLING SCHEDULING REQUEST FOR LOGICAL CHANNEL

(71) Applicant: HTC Corporation, Taoyuan (TW)

(72) Inventor: Shiang-Rung Ye, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/970,835

(22) Filed: May 3, 2018

(65) Prior Publication Data

US 2018/0324820 A1 Nov. 8, 2018

Related U.S. Application Data

(60) Provisional application No. 62/501,763, filed on May 5, 2017.

(51) Int. Cl.
*H04W 72/12* (2009.01)
*H04L 5/00* (2006.01)
(Continued)

(52) U.S. Cl.
CPC ........... *H04W 72/12* (2013.01); *H04L 5/0048* (2013.01); *H04W 72/10* (2013.01); *H04W 72/1284* (2013.01); *H04W 74/0833* (2013.01)

(58) Field of Classification Search
CPC . H04W 72/10; H04W 72/12; H04W 72/1284; H04W 74/0833; H04L 5/0048
See application file for complete search history.

(56) References Cited

U.S. PATENT DOCUMENTS

2017/0142749 A1* 5/2017 Kim ...................... H04W 76/38
2017/0310433 A1* 10/2017 Dinan .................. H04W 72/048
(Continued)

FOREIGN PATENT DOCUMENTS

| WO | 2009/116939 A2 | 9/2009 |
| WO | 2009/116939 A3 | 9/2009 |

OTHER PUBLICATIONS

3GPP TS 36.321 V14.2.1 (Mar. 2017) Technical Specification 3rd Generation Partnership Project; Technical Specification Group Radio Access Network; Evolved Universal Terrestrial Radio Access (E-UTRA); Medium Access Control (MAC) protocol specification (Release 14), Mar. 2017.
(Continued)

*Primary Examiner* — Habte Mered
(74) *Attorney, Agent, or Firm* — Winston Hsu

(57) ABSTRACT

A communication device for handling a scheduling request (SR) for a logical channel (LC) comprises a storage device storing instructions of transmitting a first SR for a first LC to a network and starting a first sr-ProhibitTimer associated to the first LC, when the first SR is triggered by the first LC and the first sr-ProhibitTimer is not running; not transmitting the first SR for the first LC, when the first SR is triggered by the first LC and the first sr-ProhibitTimer is running; transmitting a second SR for a second LC to the network and starting a second sr-ProhibitTimer associated to the second LC, when the second SR is triggered by the second LC and the second sr-ProhibitTimer is not running; and not transmitting the second SR triggered by the second LC, when the second SR is triggered by the second LC and the second sr-ProhibitTimer is running.

16 Claims, 4 Drawing Sheets

(51) Int. Cl.
*H04W 72/10* (2009.01)
*H04W 74/08* (2009.01)

(56) References Cited

U.S. PATENT DOCUMENTS

| | | | | |
|---|---|---|---|---|
| 2018/0103369 | A1* | 4/2018 | Chou | H04W 48/12 |
| 2018/0199343 | A1* | 7/2018 | Deogun | H04W 72/0453 |
| 2018/0242357 | A1* | 8/2018 | Khirallah | H04W 74/0808 |
| 2018/0317123 | A1* | 11/2018 | Chen | H04W 28/0278 |
| 2018/0324635 | A1* | 11/2018 | Babaei | H04W 28/0278 |
| 2018/0324844 | A1* | 11/2018 | Babaei | H04W 74/08 |
| 2018/0324872 | A1* | 11/2018 | Babaei | H04W 72/1284 |

OTHER PUBLICATIONS

3GPP TR 38.804 V14.0.0 (Mar. 2017) Technical Report 3rd Generation Partnership Project; Technical Specification Group Radio Access Network; Study on New Radio Access Technology; Radio Interface Protocol Aspects (Release 14), Mar. 2017.

3GPP TR 38.913 V14.2.0 (Mar. 2017) Technical Report 3rd Generation Partnership Project; Technical Specification Group Radio Access Network; Study on Scenarios and Requirements for Next Generation Access Technologies; Release 14), Mar. 2017.

3GPP TR 22.862 V14.1.0 (Sep. 2016) Technical Report 3rd Generation Partnership Project; Technical Specification Group Services and System Aspects; Feasibility Study on New Services and Markets Technology Enablers for Critical Communications; Stage 1 (Release 14), Sep. 2016.

Search Report dated Sep. 14, 2018 for EP application No. 18170866. 0, pp. 1~6.

Ericsson, ST-Ericsson, "SR Prohibit Timer", 3GPP TSG-RAN WG2#68bis, R2-096743, Nov. 9-13, 2009, Jeju, Korea, XP050391218, pp. 1-5.

LG Electronics Inc., "RB specific L2 entity", 3GPP TSG-RAN WG2 Meeting#95, R2-164967, Aug. 22-Aug. 26, 2016, Goteborg, Sweden, XP051140914, pp. 1-2.

Ericsson, "SR and BSR triggering aspects", 3GPP TSG-RAN WG2#97bis, Tdoc R2-1702746, Apr. 3-7, 2017, Spokane, USA, XP051244734, pp. 1-4.

Office action dated Oct. 15, 2019 for EP application No. 18170866. 0, pp. 1~8.

3GPP TS 36.321 V8.7.0 (Sep. 2009), "3rd Generation Partnership Project; Technical Specification Group Radio Access Network; Evolved Universal Terrestrial Radio Access (E-UTRA) Medium Access Control (MAC) protocol specification (Release 8)", XP050377623, pp. 1-44.

* cited by examiner

DEVICE AND METHOD OF HANDLING SCHEDULING REQUEST FOR LOGICAL CHANNEL

CROSS REFERENCE TO RELATED APPLICATIONS

This application claims the benefits of U.S. Provisional Applications No. 62/501,763 filed on May 5, 2017, which is incorporated herein by reference.

BACKGROUND OF THE INVENTION

1. Field of the Invention

The present invention relates to a device and a method used in a wireless communication system, and more particularly, to a device and a method of handling a scheduling request for a logical channel.

2. Description of the Prior Art

3rd Generation Partnership Project (3GPP) continues improving a long-term evolution (LTE) system by introducing carrier aggregation (CA), Dual Connectivity (DC), LTE transmission over an unlicensed spectrum (LTE-unlicensed (LTE-U) or licensed-assisted access (LAA)). 3GPP recently starts developing a next generation cellular system called a new radio (NR) system or a next generation (NextGen) system. Accordingly, Inter-system mobility between the LTE system and the NR/NextGen system should be solved, to provide seamless service continuity for a user equipment (UE) moving between the two systems.

SUMMARY OF THE INVENTION

The present invention therefore provides a method and related communication device for handling a scheduling request for a logical channel to solve the abovementioned problem.

A communication device for handling a scheduling request (SR) for a logical channel (LC) comprises a storage device and a processing circuit coupled to the storage device. The storage device stores, and the processing circuit is configured to execute instructions of transmitting a first SR for a first logical channel (LC) to a network and starting a first sr-ProhibitTimer associated to the first LC, when the first SR is triggered by the first LC and the first sr-ProhibitTimer is not running; not transmitting the first SR for the first LC, when the first SR is triggered by the first LC and the first sr-ProhibitTimer is running; transmitting a second SR for a second LC to the network and starting a second sr-ProhibitTimer associated to the second LC, when the second SR is triggered by the second LC and the second sr-ProhibitTimer is not running; and not transmitting the second SR triggered by the second LC, when the second SR is triggered by the second LC and the second sr-ProhibitTimer is running.

A communication device for handling a scheduling request (SR) for a logical channel (LC) comprises a storage device and a processing circuit coupled to the storage device. The storage device stores, and the processing circuit is configured to execute instructions of transmitting a first SR for a first logical channel (LC) to a network and starting a first sr-ProhibitTimer associated to the first LC, when the first SR is triggered by the first LC and the first sr-Prohibit-Timer is not running; not transmitting the first SR for the first LC, when the first SR is triggered by the first LC and the first sr-ProhibitTimer is running; and transmitting a second SR for a second LC to the network without starting a second sr-ProhibitTimer associated to the second LC, when the second SR is triggered by the second LC.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
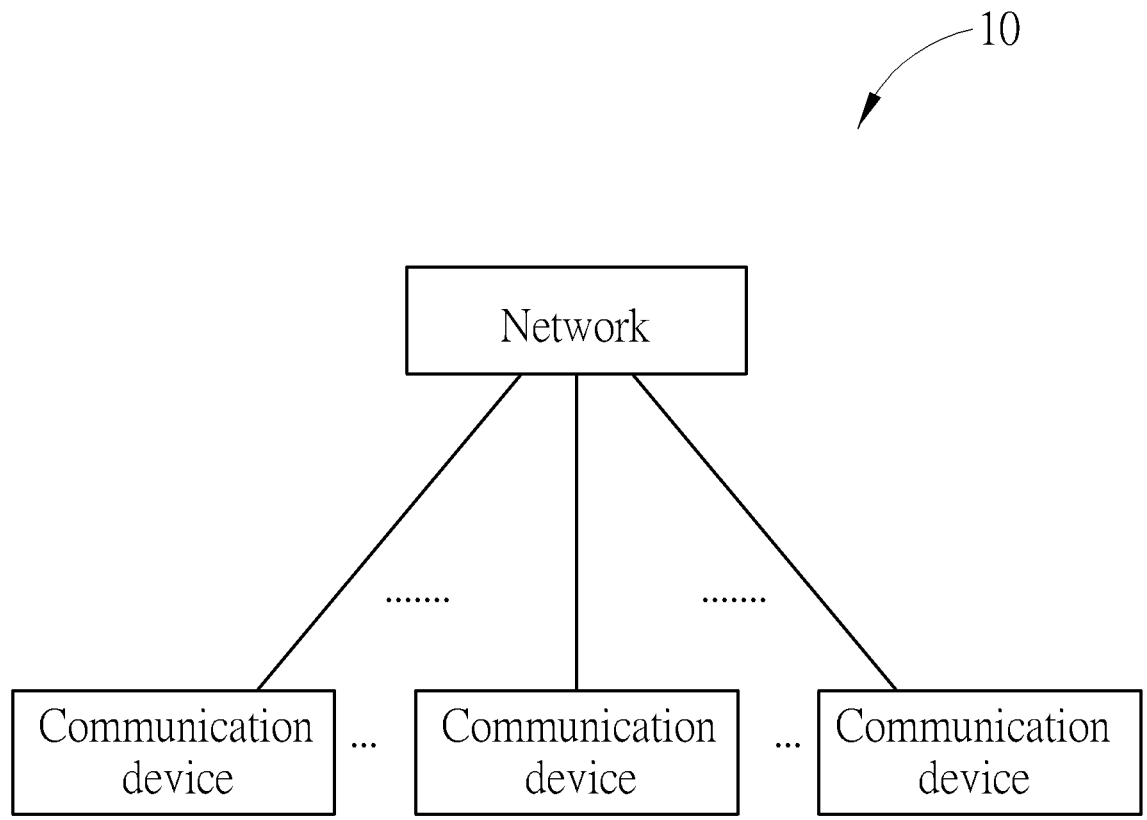
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., multiple carriers) belonging to one or multiple base stations (BSs). The abovementioned cells may be operated in the same or different duplexing modes, e.g., frequency-division duplexing (FDD), time-division duplexing (TDD) or flexible duplexing.

In FIG. 1, the network and the communication devices are simply utilized for illustrating the structure of the wireless communication system 10. Practically, the network includes at least one of a long-term evolution (LTE) network and a new radio (NR)/next generation (NextGen) network. The LTE network may include an evolved universal terrestrial radio access network (E-UTRAN) including at least one evolved NB (eNB) and an Evolved Packet Core (EPC). The at least one eNB connects to the EPC. The NR/NextGen network may include a 5G (or called NR) radio access network including at least one of a 5G BS (or called gNB) and a NextGen Core (NGC). The 5G BS connects to the NGC. An eLTE eNB is an evolution of an eNB that supports connectivity to the NGC. In this case, the eLTE eNB may be considered in the LTE network or the NR/NextGen network. The 5G radio communication technology may employ orthogonal frequency-division multiplexing (OFDM) and/or non-OFDM, and transmission time interval (TTI) shorter than 1 ms (e.g., 1, 2, 3 or 4 OFDM symbols, 100, or 200 us) for communicating between the communication devices and the 5G BS.

A communication device may be a user equipment (UE), a narrowband Internet of Things (NB-IoT) UE, a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a UL, the communication device is the transmitter and the network is the receiver, and for a DL, the network is the transmitter and the communication device is the receiver.

Figure 2:
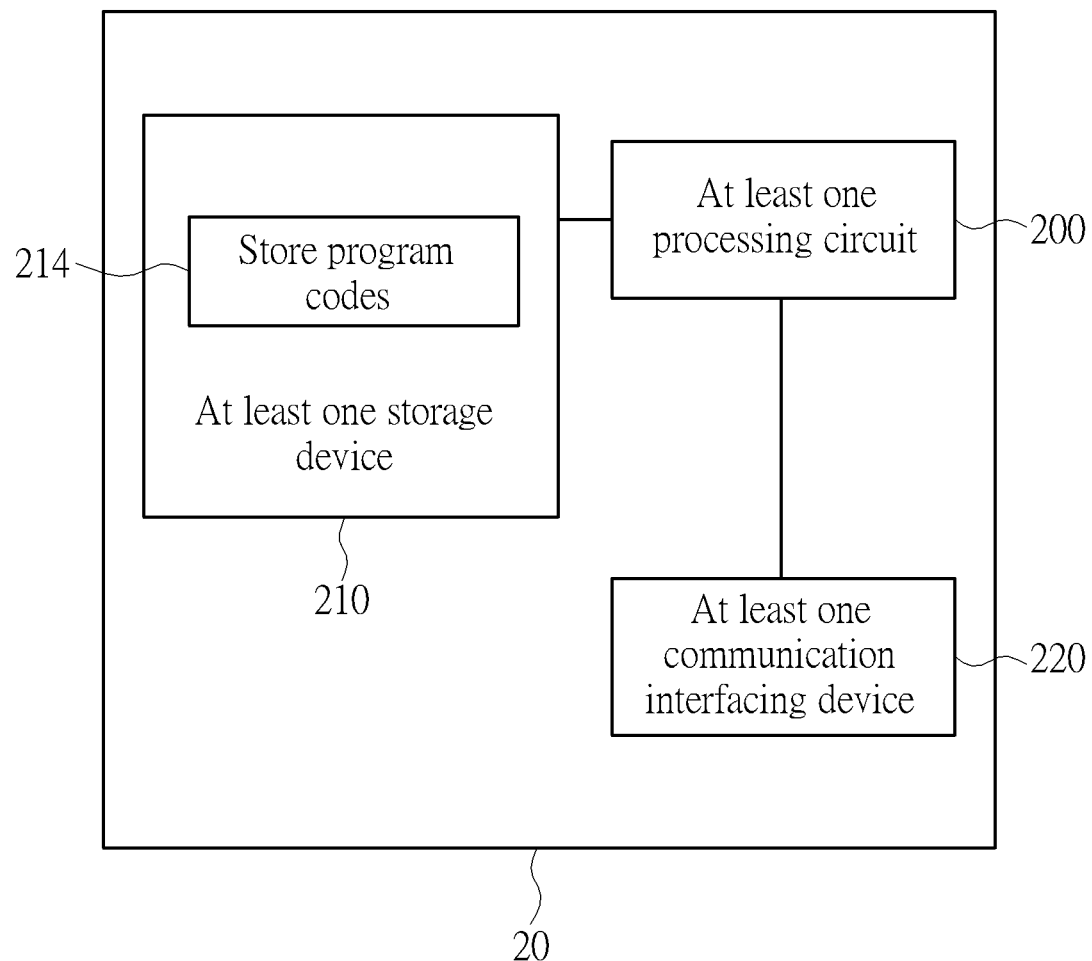
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

For the LTE network, when UL data arrives at a medium access control (MAC) entity of a UE, a scheduling request (SR) is triggered. After the SR is transmitted, a sr-ProhibitTimer is started. The sr-ProhibitTimer is used to avoid unnecessary SR transmission, especially when the UE is configured with a short SR periodicity. When the sr-ProhibitTimer is running, a SR transmission is prohibited.

For the NR network, if the same SR procedure is applied, a sr-ProhibitTimer triggered by non-Ultra-reliable and Low Latency Communication (non-URLLC) may prohibit SR transmission triggered by URLLC. However, the URLLC has a low latency requirement, and an operation of the ULLLC should not be affected by the non-URLLC.

Figure 3:
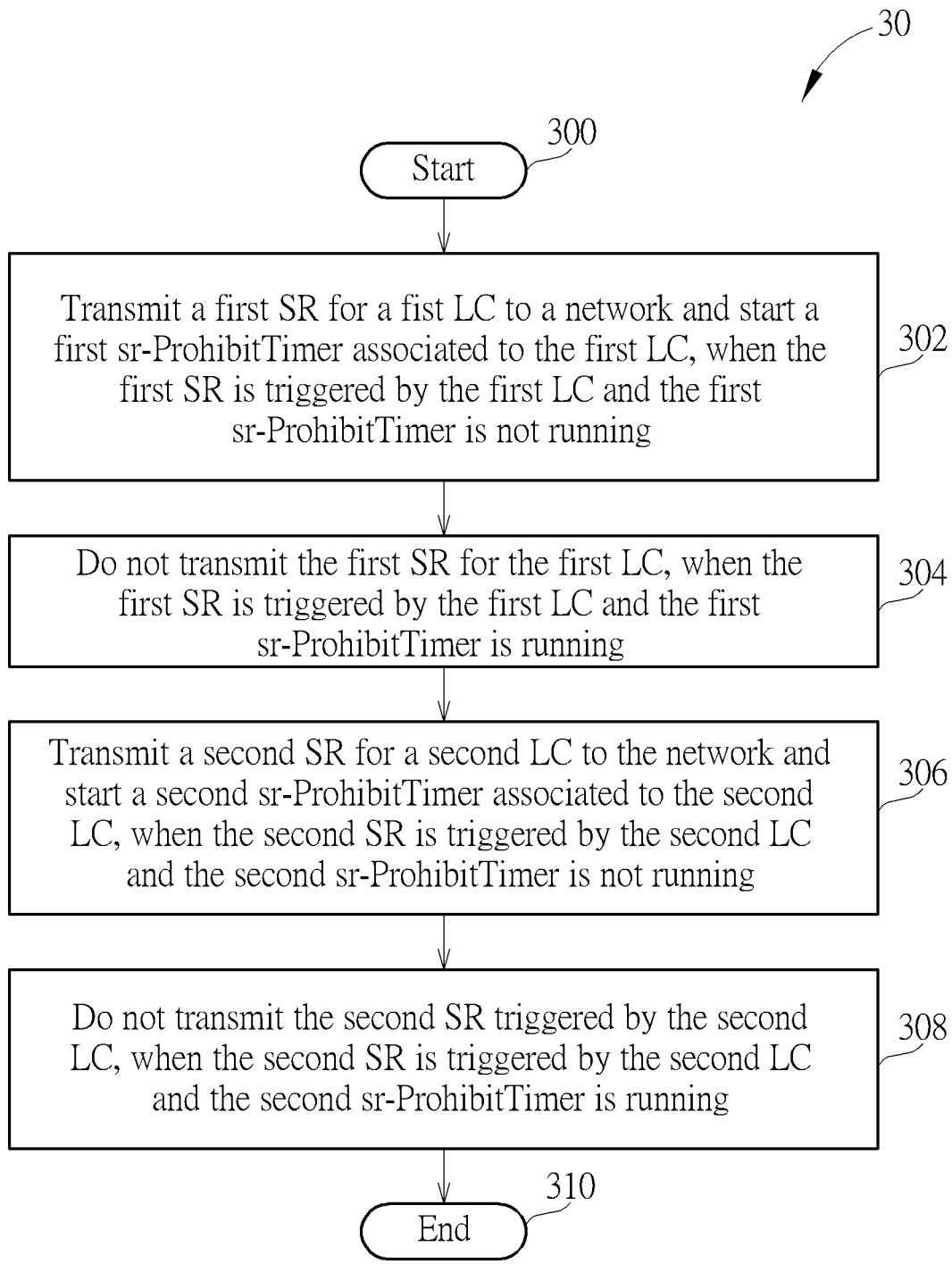
FIG. 3 is a flowchart of a process according to an example of the present invention.

A process 30 in FIG. 3 may be utilized in a UE, and includes the following steps:

Step 300: Start.

Step 302: Transmit a first SR for a first logical channel (LC) to a network and start a first sr-ProhibitTimer associated to the first LC, when the first SR is triggered by the first LC and the first sr-ProhibitTimer is not running.

Step 304: Do not transmit the first SR for the first LC, when the first SR is triggered by the first LC and the first sr-ProhibitTimer is running.

Step 306: Transmit a second SR for a second LC to the network and start a second sr-ProhibitTimer associated to the second LC, when the second SR is triggered by the second LC and the second sr-ProhibitTimer is not running.

Step 308: Do not transmit the second SR triggered by the second LC, when the second SR is triggered by the second LC and the second sr-ProhibitTimer is running.

Step 310: End.

According to the process 30, the UE transmits a first SR for a first LC to a network and starting a first sr-ProhibitTimer associated to the first LC, when the first SR is triggered by the first LC and the first sr-ProhibitTimer is not running. The UE does not transmit the first SR for the first LC, when the first SR is triggered by the first LC and the first sr-ProhibitTimer is running. The UE transmits a second SR for a second LC to the network and starting a second sr-ProhibitTimer associated to the second LC, when the second SR is triggered by the second LC and the second sr-ProhibitTimer is not running (no matter the first sr-ProhibitTimer is running or not). The UE does not transmit the second SR triggered by the second LC, when the second SR is triggered by the second LC and the second sr-ProhibitTimer is running. That is, whether a SR of a LC can be transmitted is affected by a sr-ProhibitTimer associated to the LC and is not affected by sr-ProhibitTimer(s) of other LC(s). Thus, the problem that the operation of the LC is affected by the operation(s) of the other LC(s) is solved.

Realization of the process 30 is not limited to the above description. The following examples may be applied to the process 30.

In one example, the first LC belongs to a first LC group (LCG), and the second LC belongs to a second LCG.

In one example, a third LC belongs to the first LCG. The UE transmits a third SR for the third LC and starts the first sr-ProhibitTimer associated to the first LC, when the third SR is triggered by the third LC and the first sr-ProhibitTimer is not running. The UE does not transmit the third SR triggered by the third LC, when the third SR is triggered by the third LC and the first sr-ProhibitTimer is running. That is, the LCs in a same LCG are controlled by a same sr-ProhibitTimer.

In one example, a first SR configuration is configured for the first LC by the network, and a second SR configuration is configured for the second LC by the network. Further, the first SR is transmitted via a first resource (e.g., radio resource such as time/frequency/code resource) indicated in the first SR configuration, and the second SR is transmitted via a second resource indicated in the second SR configuration. In one example, the first LC is configured with a first priority, and the second LC is configured with a second priority. In one example, the first SR is transmitted via the first resource and the second SR is not transmitted, when the first priority is higher than the second priority and the first resource and the second resource are both available. That is, only the SR with a higher priority is transmitted, when both the resources for transmitting the SRs are available (e.g., at the same time).

In one example, the UE releases at least one resource (e.g., of all serving cells) for transmitting the first SR and the second SR, if a number of at least one retransmission of the first SR and the second SR is greater than a (e.g., predetermined or configured) value. In one example, the UE releases at least one resource (e.g., of all serving cells) for transmitting at least one sounding reference signal (SRS), if a number of at least one retransmission of the first SR and the second SR is greater than a (e.g., predetermined or configured) value. In one example, the UE clears at least one DL assignment and at least one UL grant, if a number of at least one retransmission of the first SR and the second SR is greater than a (e.g., predetermined or configured) value. In one example, the UE initiates a random access procedure with the network, if a number of at least one retransmission of the first SR and the second SR is greater than a (e.g., predetermined or configured) value. In the above examples, the UE may maintain a counter for counting the number of the at least one retransmission.

In one example, the first LC is for transmitting non-Ultra-reliable and Low Latency Communication (non-URLLC) traffic, and the second LC is for transmitting URLLC traffic.

In one example, the UE transmits a first buffer status report for the first LC to the network, when there is available UL data for the first LC. Similarly, the UE transmits a second buffer status report for the second LC to the network, when there is available UL data for the second LC.

Figure 4:
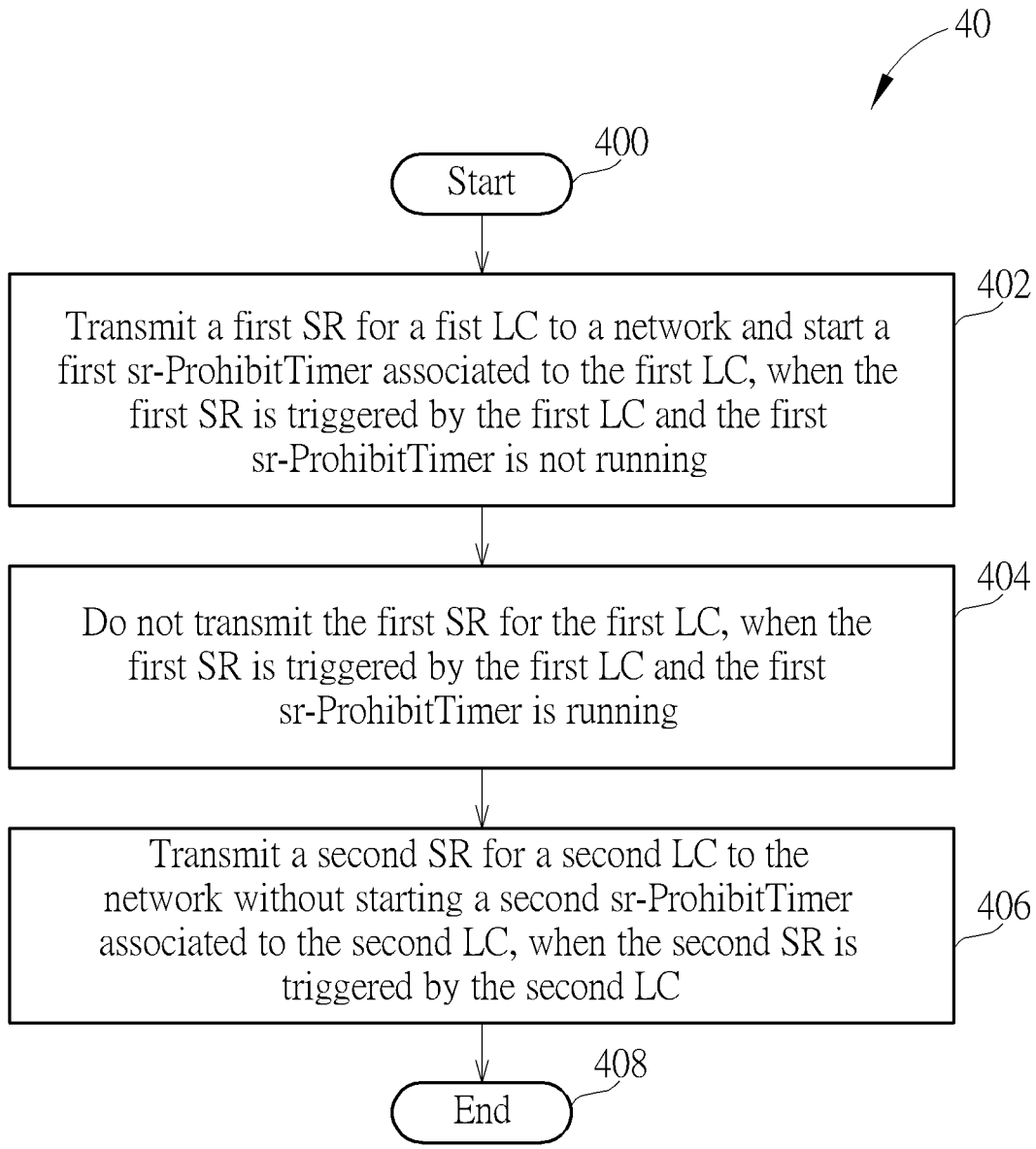
FIG. 4 is a flowchart of a process according to an example of the present invention.

A process 40 in FIG. 4 may be utilized in a UE, and includes the following steps:

Step 400: Start.

Step 402: Transmit a first SR for a first LC to a network and start a first sr-ProhibitTimer associated to the first LC, when the first SR is triggered by the first LC and the first sr-ProhibitTimer is not running.

Step 404: Do not transmit the first SR for the first LC, when the first SR is triggered by the first LC and the first sr-ProhibitTimer is running.

Step 406: Transmit a second SR for a second LC to the network without starting a second sr-ProhibitTimer associated to the second LC, when the second SR is triggered by the second LC.

Step 408: End.

According to the process 4 0, the UE transmits a first SR for a first LC to a network and start a first sr-ProhibitTimer associated to the first LC, when the first SR is triggered by the first LC and the first sr-ProhibitTimer is not running. The UE does not transmit the first SR for the first LC, when the first SR is triggered by the first LC and the first sr-ProhibitTimer is running. The UE transmits a second SR for a second LC to the network without starting a second sr-ProhibitTimer associated to the second LC, when the second SR is triggered by the second LC. That is, whether a SR of a LC can be transmitted is affected by a sr-ProhibitTimer associated to the LC and is not affected by sr-ProhibitTimer (s) of other LC (s). In addition, a SR of a LC (e.g., for emergency service) can be configured as not being controlled by a sr-ProhibitTimer. Thus, the problem that the operation of the LC is affected by the operation(s) of the other LC(s) is solved.

Examples of the process 30 can be applied to the process 40, and are not narrated herein.

Those skilled in the art should readily make combinations, modifications and/or alterations on the abovementioned description and examples. For example, the skilled person easily makes new embodiments of the network based on the embodiments and examples of the UE or the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a SR for a LC. Whether a SR of a LC can be transmitted is affected by a sr-ProhibitTimer associated to the LC and is not affected by sr-ProhibitTimer(s) of other LC(s). Thus, the problem that the operation of the LC is affected by the operation(s) of the other LC(s) is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a scheduling request (SR) for a logical channel (LC), comprising:
a storage device; and
a processing circuit, coupled to the storage device, wherein the storage device stores, and the processing circuit is configured to execute instructions of:
transmitting a first SR for a first LC to a network and starting a first sr-ProhibitTimer associated to the first LC, when the first SR is triggered by the first LC and the first sr-ProhibitTimer is not running;
not transmitting the first SR for the first LC, when the first SR is triggered by the first LC and the first sr-ProhibitTimer is running;
transmitting a second SR for a second LC to the network and starting a second sr-ProhibitTimer associated to the second LC, when the second SR is triggered by the second LC and the second sr-ProhibitTimer is not running;
not transmitting the second SR triggered by the second LC, when the second SR is triggered by the second LC and the second sr-ProhibitTimer is running; and
releasing at least one first resource for transmitting at least one sounding reference signal (SRS), if a number of at least one retransmission of the first SR and the second SR is greater than a value.

2. The communication device of claim 1, wherein the first LC belongs to a first LC group (LCG), and the second LC belongs to a second LCG.

3. The communication device of claim 1, wherein a first SR configuration is configured for the first LC by the network, and a second SR configuration is configured for the second LC by the network.

4. The communication device of claim 3, wherein the first SR is transmitted via a first resource indicated in the first SR configuration, and the second SR is transmitted via a second resource indicated in the second SR configuration.

5. The communication device of claim 4, wherein the first LC is configured with a first priority, and the second LC is configured with a second priority.

6. The communication device of claim 5, wherein the first SR is transmitted via the first resource and the second SR is not transmitted, when the first priority is higher than the second priority and the first resource and the second resource are both available.

7. The communication device of claim 1, wherein the instructions further comprise:
releasing at least one second resource for transmitting the first SR and the second SR, if a number of at least one retransmission of the first SR and the second SR is greater than a value.

8. The communication device of claim 1, wherein the instructions further comprise:
clearing at least one downlink (DL) assignment and at least one uplink (UL) grant, if a number of at least one retransmission of the first SR and the second SR is greater than a value.

9. The communication device of claim 1, wherein the instructions further comprise:
initiating a random access procedure with the network, if a number of at least one retransmission of the first SR and the second SR is greater than a value.

10. The communication device of claim 1, wherein the first LC is for transmitting non-Ultra-reliable and Low Latency Communication (non-URLLC) traffic, and the second LC is for transmitting URLLC traffic.

11. A communication device for handling a scheduling request (SR) for a logical channel (LC), comprising:
a storage device; and a processing circuit, coupled to the storage device, wherein the storage device stores, and the processing circuit is configured to execute instructions of:

transmitting a first SR for a first LC to a network and starting a first sr-ProhibitTimer associated to the first LC, when the first SR is triggered by the first LC and the first sr-ProhibitTimer is not running;

not transmitting the first SR for the first LC, when the first SR is triggered by the first LC and the first sr-ProhibitTimer is running;

transmitting a second SR for a second LC to the network and starting a second sr-ProhibitTimer associated to the second LC, when the second SR is triggered by the second LC and the second sr-ProhibitTimer is not running;

not transmitting the second SR triggered by the second LC, when the second SR is triggered by the second LC and the second sr-ProhibitTimer is running;

transmitting a third SR for a third LC and starting the first sr-ProhibitTimer associated to the first LC, when the third SR is triggered by the third LC and the first sr-ProhibitTimer is not running; and not transmitting the third SR triggered by the third LC, when the third SR is triggered by the third LC and the first sr-ProhibitTimer is running, wherein the first LC belongs to a first LC group (LCG), the second LC belongs to a second LCG, and the third LC belongs to the first LCG.

12. The communication device of claim 11, wherein a first SR configuration is configured for the first LC by the network, and a second SR configuration is configured for the second LC by the network.

13. The communication device of claim 11, wherein the instructions further comprise:

releasing at least one resource for transmitting the first SR and the second SR, if a number of at least one retransmission of the first SR and the second SR is greater than a value.

14. The communication device of claim 11, wherein the instructions further comprise:

clearing at least one downlink (DL) assignment and at least one uplink (UL) grant, if a number of at least one retransmission of the first SR and the second SR is greater than a value.

15. The communication device of claim 11, wherein the instructions further comprise:

initiating a random access procedure with the network, if a number of at least one retransmission of the first SR and the second SR is greater than a value.

16. The communication device of claim 11, wherein the first LC is for transmitting non-Ultra-reliable and Low Latency Communication (non-URLLC) traffic, and the second LC is for transmitting URLLC traffic.

* * * * *